(12) United States Patent
Lindborg (10) Patent No.: US 11,333,396 B2
(45) Date of Patent: May 17, 2022

(54) SUPPLY AIR DEVICE FOR CONTROLLING SUPPLY AIR FLOW

(71) Applicant: Lindinvent AB, Lund (SE)

(72) Inventor: Herman Lindborg, Dalby (SE)

(73) Assignee: LINDINVENT AB, Lund (SE)

( * ) Notice: Subject to any disclaimer, the term of this patent is extended or adjusted under 35 U.S.C. 154(b) by 378 days.

(21) Appl. No.: 16/338,684

(22) PCT Filed: Oct. 2, 2017

(86) PCT No.: PCT/EP2017/074977
§ 371 (c)(1),
(2) Date: Apr. 1, 2019

(87) PCT Pub. No.: WO2018/065363
PCT Pub. Date: Apr. 12, 2018

(65) Prior Publication Data
US 2019/0226717 A1 Jul. 25, 2019

(30) Foreign Application Priority Data

Oct. 4, 2016 (EP) ..................... 16192177

(51) Int. Cl.
*F24F 13/24* (2006.01)
*F24F 13/06* (2006.01)
(Continued)

(52) U.S. Cl.
CPC .............. *F24F 13/24* (2013.01); *F16K 47/04* (2013.01); *F16K 47/08* (2013.01); *F24F 11/74* (2018.01);
(Continued)

(58) Field of Classification Search
CPC .. F24F 13/24; F24F 13/06; F24F 13/10; F24F 11/74; F24F 2013/0608; F24F 2013/242; F24F 2110/30; F16K 47/08; F16K 47/04
See application file for complete search history.

(56) References Cited

U.S. PATENT DOCUMENTS 3,605,787 A   9/1971 Krogfoss et al.
6,152,818 A * 11/2000 Jacob ................ H01L 21/67017
                                                   454/187
(Continued)

FOREIGN PATENT DOCUMENTS

DE   2410231 A1   9/1975
EP   0186268 A2   7/1986
WO   2013/137803 A1   9/2013

OTHER PUBLICATIONS

International Search Report and Written Opinion for PCT Application No. PCT/EP2017/074977, dated Dec. 19, 2017, 11 pages.

*Primary Examiner* — Jessica Yuen
(74) *Attorney, Agent, or Firm* — The Marbury Law Group PLLC (57) ABSTRACT

Supply Air device (1) for controlling supply air flow to a building space, comprising a chamber (2) having a supply air inlet (3) and an air outlet (4). A first tube (10) in the chamber is connected at an open first end (11) to the supply air inlet, wherein the first tube has a side wall (13) which is permeable to air. A throttle member (30) is slidably connected to the first tube to change a degree of exposure of the side wall to control air flow through said side wall to the outlet. The exposable side wall comprises a layer of porous material (14) through which air is discharged.

18 Claims, 3 Drawing Sheets

(51) Int. Cl.
*F24F 13/10* (2006.01)
*F24F 11/74* (2018.01)
*F16K 47/08* (2006.01)
*F16K 47/04* (2006.01)
*F24F 110/30* (2018.01)

(52) U.S. Cl.
CPC .............. *F24F 13/06* (2013.01); *F24F 13/10* (2013.01); *F24F 2013/0608* (2013.01); *F24F 2013/242* (2013.01); *F24F 2110/30* (2018.01)

(56) References Cited

U.S. PATENT DOCUMENTS

| | | | | |
|---|---|---|---|---|
| 8,808,075 B2 * | 8/2014 | Gebke | ....................... | B32B 3/10 454/297 |
| 2004/0033776 A1 * | 2/2004 | Currie | ................... | F24F 13/062 454/284 |

* cited by examiner

SUPPLY AIR DEVICE FOR CONTROLLING SUPPLY AIR FLOW

CROSS-REFERENCE TO RELATED APPLICATIONS

This application is a National Phase Entry of PCT Application No. PCT/EP2017/074977 filed Oct. 2, 2017; which claims priority from European Application No. 16192177.0 filed Oct. 4, 2016. The above applications are hereby incorporated by reference in their entireties as if fully set forth herein.

TECHNICAL FIELD

This disclosure relates to the field of devices for regulation of air flows. More specifically, solutions are presented in the field of supply air devices for variable restriction of flows for use in different types of building spaces.

BACKGROUND

In ventilation systems, supply air devices or terminals are configured to supply air into building spaces. Traditionally, terminals providing a steady flow have predominantly been used. In recent years, though, energy saving has been a key focus area, for both environmental and financial reasons. This has in turn led to increased use of air terminals capable of providing variable flow. By controlling the supply air flow, air can be provided according to need, and may also replace liquid-based cooling systems, by providing a controlled amount of tempered air.

The use of variable flows may cause flow changes in supply air duct systems, and hence large pressure differences at the terminals. Also, modernization of older buildings for energy efficiency reasons will often require high pressure in the system, since there may oftentimes not be room for large dimension air ducts in lowered ceilings. This means that there is a need for a type of air supply device that can cope with both high and low air pressure, while providing a controlled regulated air flow.

A supply air terminal typically comprises a chamber, such as a metal box, with a supply air inlet, an air valve mechanism for regulation of the airflow, and a discharge opening to an air diffuser. The air valve mechanism must be capable of throttling the air at high pressure, such as 200 Pa or more. At the same time there is normally a requirement on generated sound level at the premises, such as a maximum limit of 30 dB(A). Airflow control at high pressure and restriction of sound level generation are substantially conflicting requirements, which require careful deign. Concurrently, a supply air device which can be manufactured, assembled and maintained at low cost is an overall objective.

U.S. Pat. No. 8,038,075 presents an example of a traditional solution for throttling the air flow, based on narrowing the airstream by minimizing an opening using a damper rotatably mounted within an air duct. Variants of this pivotable plate design are well known in the art. When such an opening is closed, turbulence will appear over the damper edge and a relatively high sound level will be generated, which requires some form of damping. One way of targeting sound generation is to provide brushes at the rim of the throttle so as to reduce turbulence effects.

U.S. Pat. No. 5,207,614 presents an alternative solution, where the working principle for flow control is to translate perforated plates with respect to each other, so as to selectably open or occlude the perforations. Also here there will be sound generation over the edges of the perforations.

WO0235157, by the instant inventor, produced a different solution, where damping was achieved by narrowing a plurality of parallel sheets over an extended distance. This way, successive retardation of passing air is obtained while maintaining a substantially laminar flow, thereby minimizing sound generation.

US2013247995 discloses a different solution, but based on the same principle. Rather than directing air though a passage between narrow sheets, a porous media air restrictor is placed in the valve flow passage. Instead of producing high velocity and turbulent flow about an orifice, the pressure drop is controlled by viscous dissipation in the micro-passages within the porous media, in which random and arbitrary passages provide long, relative to diameter, convoluted passages that operate to generate pressure drop while limiting fluid flow velocity.

SUMMARY

An object of the inventions is to provide improvements in the field of supply air devices for controlling air flow. More specifically, it is an object to provide a supply air device capable controlling air flow with minimal generation of sound.

According to one aspect, a supply air device is provided, for controlling supply air flow to a building space, comprising
a chamber having a supply air inlet and an air outlet;
a first tube in said chamber, connected at an open first end to the supply air inlet, wherein the first tube has a side wall which is permeable to air;
a throttle member slidably connected to the first tube to change a degree of exposure of the side wall to control air flow through said side wall to the outlet,
wherein the exposable side wall comprises a layer of porous material through which air is discharged.

In one embodiment, a first portion of the side wall adjacent the first end of the tube comprises the layer of porous material, whereas a second portion of the side wall, distal from the first end, is open to provide unrestricted flow upon exposure.

In one embodiment, said porous material is a nonwoven fiber porous material.

In one embodiment, said felt comprises polyester fiber.

In one embodiment, said porous material is fabric. In one embodiment, an initial length portion of the side wall extending from the first end comprises a layer of porous material of a first thickness, and a subsequent length portion of the side wall comprises a layer of porous material of a second thickness which is smaller than the first thickness.

In one embodiment, a double porous material layer is provided at the initial length portion layer, and a single porous material layer is provided at the subsequent length portion.

In one embodiment, the layer of porous material is folded at said initial length portion.

In one embodiment, said first tube comprises a metal wire net, rolled up to a cylinder and fitted with said layer of porous material.

In one embodiment, said throttle member comprises a second tube with an open end, wherein the second tube is configured to slide telescopically about the first tube.

In one embodiment, said second tube has a closed end opposite its open end.

In one embodiment, said second tube has a sound-eliminating sleeve extending axially beyond the open end of the second tube, configured to engage about a rim at the air supply inlet upon closing the valve.

In one embodiment, the supply air device comprises an actuator configured to move the throttle member along the first tube; and a flow sensor suspended at said air supply inlet, connected to control the actuator.

In one embodiment, the supply air device comprises a suspension mechanism including a guide bar and a support member engaged to the guide bar and axially movable along the guide bar, said suspension mechanism suspending the throttle member or the first tube to the chamber.

In one embodiment, a friction-suppressing protection layer is provided on a surface of the layer of porous material, onto which said throttle member is configured to slide.

In one embodiment, a dust-rejecting protection layer is provided on a surface of an inner face of the layer of porous material.

In one embodiment, a protection layer is provided over both the inner and outer face of the layer of porous material.

In one embodiment, the protection layer is provided over both the inner and outer face of the layer of porous material.

In one embodiment, the protection layer is folded about an edge of the porous material.

In one embodiment, said protection layer comprises a fiber net with has a mesh size in the range of 0.5-2 mm.

DESCRIPTION OF EMBODIMENTS

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. Well-known functions or constructions may not be described in detail for brevity and/or clarity. Unless otherwise defined, all terms, including technical and scientific terms, used herein have the same meaning as commonly understood by one of ordinary skill in the art to which this invention belongs.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
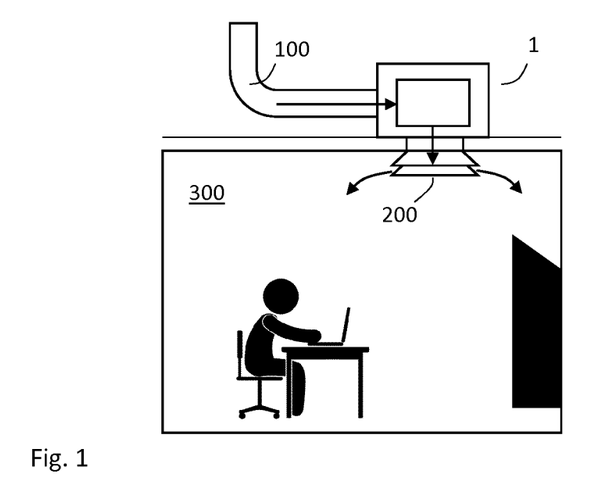
FIG. 1 schematically illustrates a general presentation of a supply air device or terminal, situated to provide fresh air from an air duct to a room.

FIG. 1 presents a scene of use for embodiments presented herein. A supply air duct 100 transports air at elevated pressure to various rooms 300 of a building complex. In order to provide comfortable ventilation flow and temperature, a supply air device 1 is connected to the supply duct 100, for controlling at least the flow of air to the room 300 through an air outlet. A diffusor 200 may be connected at the outlet, for convenient distribution of air in the room 300. While FIG. 1 illustrates mounting within the ceiling of a room, the device 1 may have its outlet to a wall of the room 300 in an alternative configuration.

Figure 2:
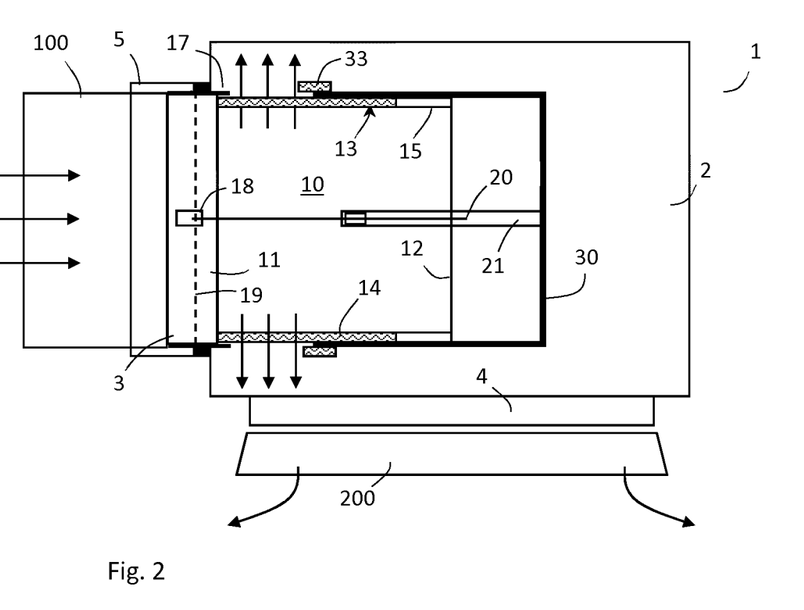
FIG. 2 illustrates an embodiment of a supply air device, including features that may be included also in other embodiments, in a first air flow control setting.

FIG. 2 illustrates an exemplary embodiment of a supply air device 1 for use as indicated in FIG. 1, for controlling supply air flow to a building space. The device 1 includes a chamber 2, having a supply air inlet 3 and an air outlet 4. The chamber 2 may be a metal case, e.g. of aluminum or steel sheet, and is sometimes referred to as a plenum box. The chamber 2 may take any form, but the illustrated embodiment has substantially rectangular cross-sections according to the established art. The shown embodiment is designed for inner ceiling mounting, and has its supply air inlet 3 at a side wall, and the air outlet 4 at a bottom wall. It may be noted, though, that the depicted design may be rotated and suspended in any direction.

A supply air duct 100 is connectable to the inlet 3, e.g. by tight fitting to a sleeve 5. The inlet may take any shape, such as having a rectangular or oval cross-section, while the shown embodiments are designed for a preferred embodiment having a circular cross-section. Also the air outlet 4, for discharging ventilation air, may take any form, such as rectangular or circular. A diffusor 200 may be included or attachable to the outlet 4, or outlet 4 may alternatively be connected to a second duct (not shown) before an air discharging terminal.

Inside the chamber 2 an air valve mechanism is provided, for controlling airflow through the device 1. A first tube 10 is provided in the chamber, connected at an open first end 11 to the supply air inlet 3. In one embodiment, connection of the tube 10 to the inlet opening 3 may be provided by means of snug fitting of one or more O-ring seals between the outer circumference of the tube 10 and the sleeve 5. Alternative ways of attaching the tube to the inlet 3 are plausible, e.g. by means welding or gluing. Preferably, the joint between the first tube 10 and the inlet 3 is substantially air-tight, in the sense that air provided through the duct is solely or at least predominantly to the inner of the first tube 10. Other ways of connecting the first tube 10 to the inlet 3 will be evident from the alternative embodiment illustrated in FIG. 12.

Passing of air through an opposing second end 12 of the first tube 10 is preferably prevented, either by that end 12 being closed or by an additional member closing the second end 12, as will be discussed. Instead, the tube 10 is configured with a side wall 13 which is permeable to air. The air-permeable part of the side wall may be entirely circumferential, or occupy segments about the circumferential wall 13. A throttle member 30 is further comprised, slidably connected to the first tube 10 to change a degree of exposure of the side wall 13, to control air flow there through. In this context, the first tube 10 and the throttle member 30 may be configured to slide vis-à-vis each other to expose a varying degree of the first tube side wall 13. In one embodiment, the first tube 10 and the throttle member 30 may be connected to slide at least axially with respect to each other. In an alternative, or combined, embodiment, the first tube 10 and the throttle member 30 may be connected to slide rotatably with respect to each other, so as to align an air-permeable part of the first tube 10 with an opening in the throttle member 30. In the embodiment of FIG. 1, which is presently described, the throttle member 30 comprises a second tube, configured to slide about the first tube 10. In this sense, a first end 31 (to the left in FIG. 1, see also FIG. 4) of the second tube 30 is open, and has a cross-section matching that of the inner tube in shape, and sized such that the inner dimensions of the second tube 30 mate snuggly with the outer dimension of the first tube 10. The air flow out from the side wall 13, as indicated by arrows in the drawing, is determined at least in part by the degree of its exposure, as controlled by the throttle member 30. In this embodiment, the degree of exposure may be controlled by means of an actuator device 18, such as a step engine. In the embodiment of FIG. 1, the actuator device 18 is suspended at the inlet 3 of the device, e.g. by means of a spoke-like suspension mechanism 19. In addition to an engine, the actuator device 18 may include a flow sensor for detecting the flow of the supply air from the duct 100, and a controller for selectively control the actuator based on inter alia sensed flow. The actuator 18 is in turn connected to the throttle member 30 by means of a threaded rod 20, passing through a nut member 21 in the throttle member 30. In an alternative embodiment control signals from the flow sensor at the inlet 3 may be wirelessly transmitted to actuator, configured to translate the throttle member. In such an embodiment, the actuator may rather connect the throttle member 30 to the backside of the chamber.

In the illustrated embodiment, the second end 32 (to the right) of the throttle member 30 is closed to prevent air from passing that way. Alternatively, the second end 12 of the first tube 10 may be closed, allowing only the rod 20 or the nut member 21 to slide through a central opening in the second end 12. In such an embodiment, the second end 32 of the throttle member may be open.

The presented design has several benefits. For one thing, the exposed side wall area is a linear function of the throttle displacement. Control of the actuator 18 is thus simplified. In addition, this design has the benefit of being capable of exposing an opening at the side wall 13 which is substantially larger that the cross section of the inlet 3. For a circular cross-section of diameter D, already a side wall 13 opening of length ¼ D equals the inlet area. The inventor ha used this relationship to add a damping surface in the shape of a layer of a porous material 14, provided at the side wall 13 of the first tube 10, through which air is discharged. This way, a drastic reduction of sound generation is obtained from the supply air device. In one embodiment, the porous material 14 is a nonwoven fiber felt or a fabric, including e.g. polyester fiber. In a preferred embodiment the fiber felt 14 comprises thermo-bonded Polyethylene Terephthalate. Such materials, such as the product Airfelt™ marketed by CE Produkter AB, are normally often used as sound absorbent layers, e.g. along the inner wall of plenum boxes such as the chamber 2. However, the instant inventor also discovered the surprising effect that passing air at high pressure straight through such a layer of felt 14 had a very positive silencing effect, even when the flow is directed towards a surface just within a few cm after the felt. In the solution presented herein, it has been concluded that the felt 14 will provide turbulence disruption even at a very small thickness, such as 4-8 mm, e.g. 5 mm. This mat e.g. be obtained using a nonwoven PET fiber felt having a density on the range of 10-50 kg/m$^3$. This has the positive effect that even if the side wall 13 of the first tube 10, through which the air flows, is relatively close to the walls (sides, up and down) of the chamber 2, the sound level generated can be kept at a low level even at high pressure in the supply air. Test have been conducted with air pressure up to at least 200 Pa and a flow level of 120 l/s indicating acceptable sound levels.

The design proposed herein makes it possible to set the opening of the air valve mechanism by throttling, so as to change the degree of exposure of the air-permeable portion of the side wall 13. As can be gathered from FIG. 1, movement of the throttle member 30 towards the inlet 3 will lead to a narrower opening at the sidewall 13. Eventually, the open end 31 of the throttle member 30 will substantially or fully close the opening, by engagement with an abutment 17. This abutment may e.g. be a rim 17 at the inlet 3, attached to the chamber 2 or to the first tube 10 adjacent to the first end 11. In one embodiment, the second tube 30 has a sound-eliminating sleeve 33 extending axially beyond the open end 31 of the second tube, configured to engage about a rim 17 at the air supply inlet 3 upon closing the valve. This arrangement may provide additional sound attenuation at near closed setting of the device 1.

Figure 3:
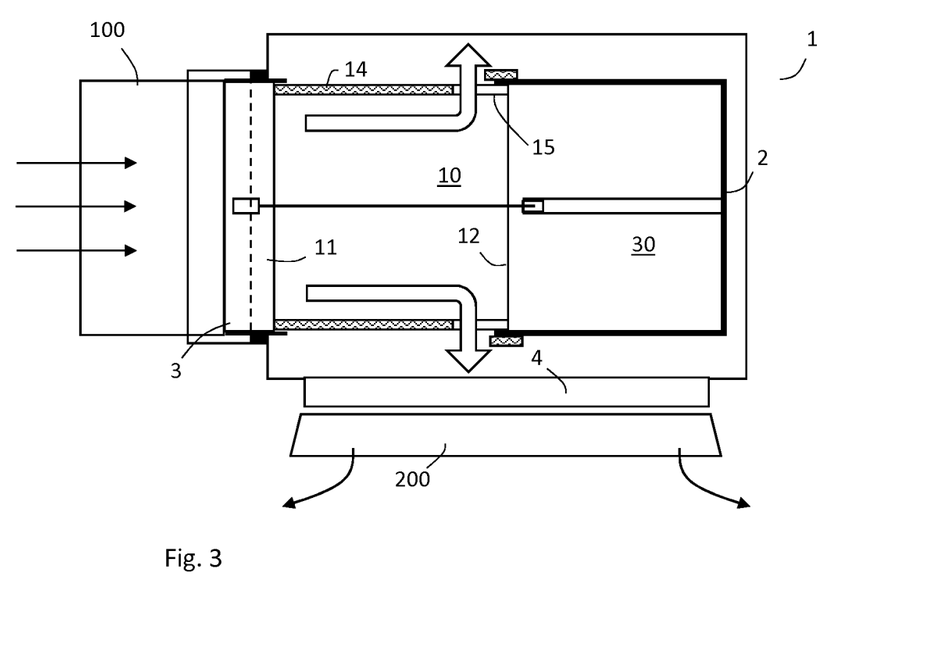
FIG. 3 illustrates the embodiment of FIG. 2 in a different air flow control setting.

FIG. 3 illustrates the embodiment of FIG. 2 in a different throttling setting. Even if ventilation systems normally are provided with air filters for cleansing the intake air, there will always be a certain degree of pollution in the air. Additionally, as ventilation filters age without being switched, there cleansing effect may deteriorate. The presence of pollution in the supply air may lead to adhesion of dust on the inside surfaces of the ventilation system, which has negative effects such as the risk of creating sound at dirt buildup, and counteracting a desired damping effect. To alleviate this problem, a substantially open portion 15 of the first tube 10 is provided. While a first portion 14 of the side wall 13, adjacent the first end 11 of the tube 10, comprises the layer of porous material, a second portion 15 of the side wall 13, distal from the first end 11, is open to provide unrestricted flow upon exposure. This is illustrated in FIG. 3. While the porous material 14 will still be permeable, the substantially free opening 15 will be unrestricted when exposed, and the airflow will take the easiest way out, as indicated by the broad arrows. This way, any dust that has settled at e.g. the inside wall of the porous material 14, will be ripped off and flushed out. This design provides a self-cleaning function to the supply air device 1. A ventilation control system for the building in which the device 1 is located may be configured to set the device 1 in the open position of FIG. 3 at predetermined time periods, for cleaning purposes. In an office building, this may e.g. be carried out at night, and may further be under the control of a presence detector.

Figure 4:
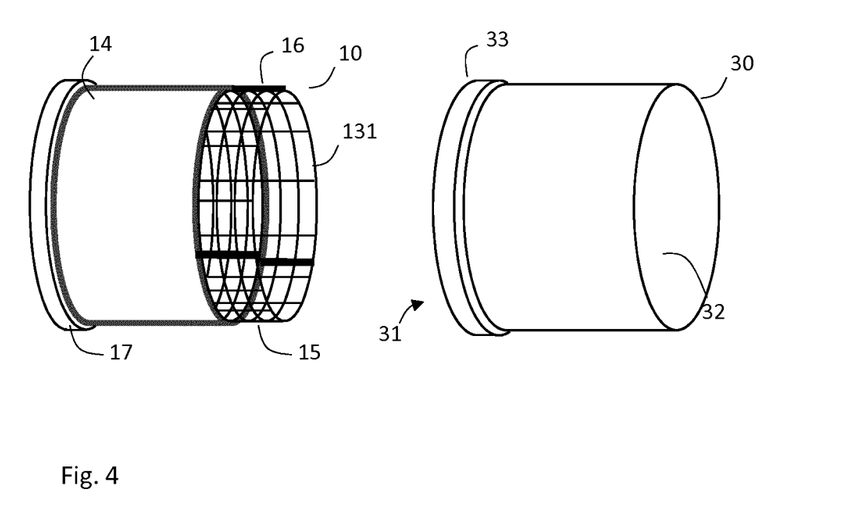
FIG. 4 schematically illustrates two cooperating members of an embodiment, in a disassembled state.

FIG. 4 illustrates the first tube 10 and the second tube 30 of the throttling member when taken apart, for the sake of convenience. In one embodiment, the first tube comprises a support structure for carrying the porous material layer 14. In one embodiment, the support structure 131 is made from a perforated metal sheet. In such an embodiment, the perforations preferably cover a larger portion of the envelope area of the support structure than the remaining metal material of the sheet surrounding the perforations, since the object of the perforations is not that of throttling or attenuation, which may induce noise. In another embodiment, the support structure is made from a metal wire net 131, rolled up to a cylinder and fitted with said layer of porous material. The use of a wire net, rather than a perforated metal sheet as is common in the art, provides both low cost, easy handling, and also a substantially full opening at the open portion 15. The mesh size should be at lease such that the openings are wider than the distance between the wires, and preferably at lease 3-5 times the wire width. At the open first end 11, a collar sleeve 17 may be provided, for attaching the first tube to the inlet 3 in the chamber 2. The rolled-up wire net cylinder may e.g. be wound, riveted or welded together.

About the support structure 131, the porous material layer 14 is provided. This layer may be provided to the support structure 131 before or after rolling up to a cylinder. In one embodiment, guide members 16 are provided on the support structure 131 at the open portion 15. This may provide the suitable effect of allowing the throttle member 30 to slide conveniently over the distal edge of the porous material layer with little or no friction or mechanical resistance. In the disclosed example, the guide members, which may be provided in any suitable material, extend substantially axially at certain parts of the support structure 131, with a height over the support structure 131 substantially equaling that of the thickness of the porous material layer 14. Preferably at least three such axially extending guide members are included. In an alternative embodiment, a guide member may instead, or in combination, be provided by means of a circumferential portion after (to the right in the drawing) of the open portion 15 (not shown), having substantially the same width as the porous material-covered portion 14.

Figure 5:
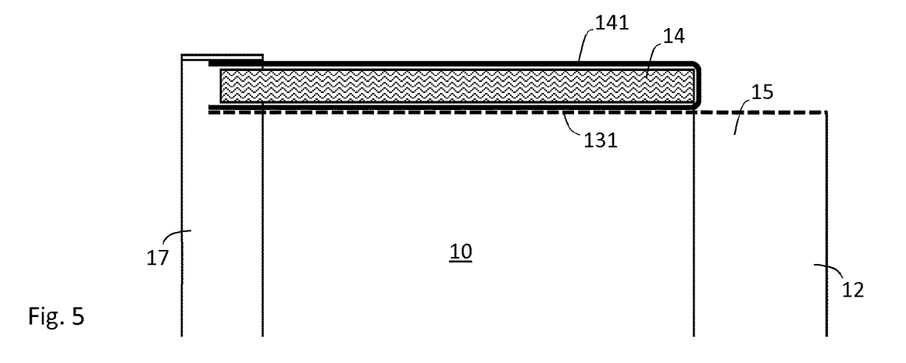
FIGS. 5-7 illustrate various embodiments by presenting a portion of a part of the supply air device in cross-section.

FIG. 5 schematically illustrates a cross-section view of a top portion of the first tube 10, for use in e.g. an embodiment of FIG. 2. In this embodiment, the open first 11 end to the left is encompassed by a sleeve 17, such as a flat metal ribbon, which also may be configured to clamp the porous material layer 14 to the support structure 131. This drawing indicates how a protection layer 141, e.g. in the form of a fiber net, may be provided over the porous material layer 14. In another embodiment, the protection layer 141 may be a permeable or perforated layer or coating, provided over the porous material 14. The purposive effect of the protection layer is preferably not throttling or attenuation, though, and compared to the porous material the attenuating effect is preferably negligible. In one embodiment, the protection layer 141 is provided only on the outer face of the porous material layer 14, for the purpose of providing a smooth surface on which to telescopically slide the second tube 30 of the throttle member. In another embodiment, the protection layer is provided on both the inside face and the outer face of the porous material 14. In one embodiment, the protection layer may be of different character on the inner face than on the outer face of the porous material 14. In one embodiment, the protection layer 141 formed on the outer face of the porous material is configured to minimize friction against the second tube 30 tube, by means of which the outer face of the porous material is provided with a friction-suppressing protection layer. Such a friction-suppressing protection layer may be made of e.g. polyester or a Teflon-like material. In one embodiment, the protection layer 141 formed on the inner face of the porous material is configured to minimize collection of dust or other pollution on the surface of the porous material 14, wherein the inner face of the porous material is provided with a dust-rejecting protection layer. Such a dust-rejecting protection layer may be made of e.g. polyester or a non-stick material such as Teflon. In the depicted embodiment, the protection layer 141 is folded about the porous material at the distal end 12 (right in the drawing) of the porous material layer 14, such that both ends of the protection layer 141 are provided at the first end 11. This way, the protection layer 141 may be conveniently clamped by, or otherwise fastened at, the sleeve 17. In addition, the distal end of the porous material layer 14 will be protected from damage, such as fraying, when the throttle member slides back from the open position as seen in FIG. 3. In one embodiment the protection layer includes a fiber net with a mesh size in the range of 0.5-2 mm, or 0.5-1.2 mm, and may be made of polyester. Tests have shown that such a fiber net provides the function of both a friction-suppressing protection layer on the outer face, and a dust-rejecting protection layer on the inner face of the porous material 14, which may be provided as a layer of felt, as described.

Figure 6:
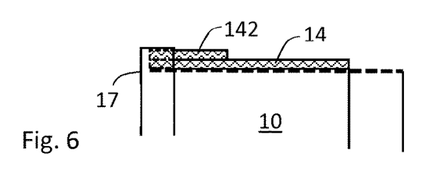

FIG. 6 illustrates a similar view as in FIG. 5, and may optionally also involve the protection layer 141. In the depicted embodiment, an initial length portion 142 of the side wall 13, extending from the first end 11, the layer of porous material 14 has a first thickness, whereas the porous material 14 at a subsequent length portion of the side wall 13 has a second thickness which is smaller than the first thickness. In one version of this embodiment, a thicker sheet of porous material is provided in the initial length portion, such as e.g. 10 mm thick, whereas the remaining porous material layer 14 is made from a sheet of 5 mm thickness. Alternatively, as shown in FIG. 6, one porous material sheet is provided in the entire porous material layer 14, e.g. of 5 mm thickness, whereas an additional sheet is placed over (or under) the first sheet in the initial length portion 142. It should be noted, though, that these are exemplary measurements and that much larger thicknesses may be used, such as up to 25 mm or more, e.g. for industrial ventilation purposes.

Figure 7:
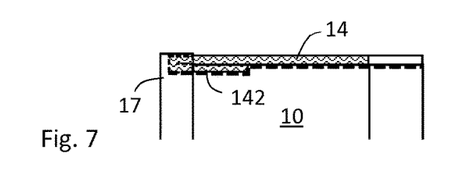

FIG. 7 illustrates an alternative embodiment to that of FIG. 6. In this embodiment, a single sheet of porous material 14 is provided, which sheet is folded at least once to be thicker at said initial length portion 142. In the drawing of FIG. 7, it is also indicated that the support structure 131 may be indented at the initial portion 141, so as to obtain a substantially even outer surface of the first tube 10. Such an indentation may also be employed for the embodiments discussed in relation to FIG. 6.

Figure 8:
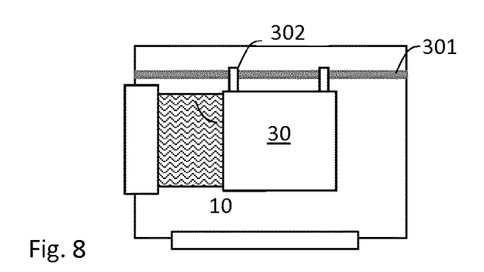
FIGS. 8-9 illustrate embodiments for suspending a member in the device.

FIG. 8 schematically illustrates, in less detail, an embodiment along the lines described with reference to the previous drawings. This drawing also discloses a suspension mechanism including a guide bar 301 and a support member 302 engaged to the guide bar and axially movable along the guide bar. This suspension mechanism is configured to suspend the sliding member, i.e. either the throttle member 30 or the first tube 10, to the chamber 2. In FIG. 8, the first tube 10 is connected to the inlet 3 of the chamber 2, whereas a guide bar 301 is attached to the chamber 2 for the throttle member 30 to glide on, e.g. by means of hooks 32. Translation of the throttle member 30 may be accomplished by means of the actuator 18 function described with reference to FIG. 2 above.

Figure 9:
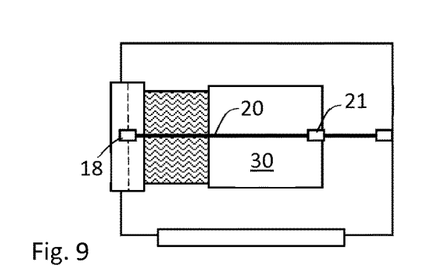

FIG. 9 illustrates an alternative design, where the rod 20 which the actuator 18 operates passes through the nut member 21 and the throttle member 30, to attach to the opposite wall in the chamber 2. This way, the actuator rod 20 also operates as a guide bar for the throttle member 30. Such an embodiment is preferably configured with a substantially airtight nut arrangement 21. As will be readily understood by the skilled reader, any of the embodiments of FIGS. 8 and 9, which are exemplary only, may be combined with any of the embodiments presented above.

The general and specific embodiments described above are all exemplified with the solution of the throttle member 30 sliding telescopically about the fixed first tube 10. Variants of this example, falling within the scope of the general solution presented herein, will now be described with reference to drawings 10 and 11. Most details are left out, or not provided with reference numerals, in these drawings for the sake of simplicity. The function of these embodiments will nevertheless be understood by reference to the embodiments described in more detail above. Description of the drawings of FIGS. 10 and 11 will thus focus on how they differ from those of the preceding drawings.

Figure 10:
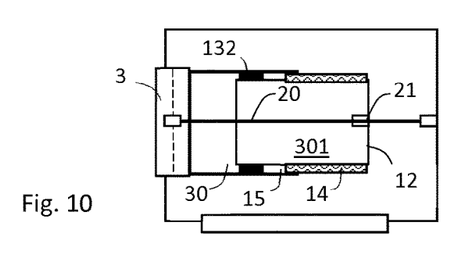
FIGS. 10-11 illustrate embodiments which are partly alternative to the design of FIG. 1, while configured to operate under the same general principles.

FIG. 10 shows an embodiment which is substantially similar to that of FIG. 2, but partly operates in the opposite manner to obtain the indicated results and effects. In this embodiment, the throttle member 30 is instead connected to the inlet 3. The throttle member 30 is here an open tube 30, within which the first tube 10 is connected to slide axially. An actuator 18 is configured to drive the first tube along the throttle member 30, by means of the rod 20 connecting to a nut 21 at the outer end 12 of the first tube 10. The outer end 12 of the first tube 10 is closed, ensuring that air is only discharged from an exposed portion of the side wall 13. The throttle member 30, on the other hand, has an open outer end 32. Like for previous embodiments a layer of porous material 14 is provided on the side wall 13. Preferably, also an open portion 15 is included, which will be exposed upon full opening of the valve mechanism. A support structure 132 may furthermore be provided, to maintain proper guiding, and optionally also sealing, between the throttle member 30 and the first tube 10. The embodiments of FIGS. 5-7 may also be applied to this embodiment, preferably with a sleeve 17 arranged at the outer end 12 of the first tube 10.

Figure 11:
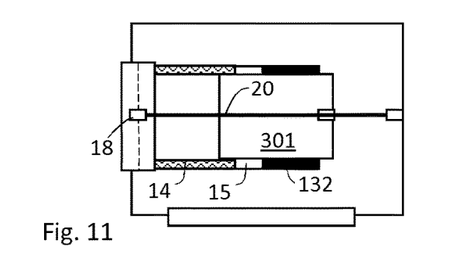

FIG. 11 discloses another alternative embodiment. In this variant, the first tube 10 is attached at the inlet 3, whereas the throttle means are configured to slide axially along the first tube 10, similar to the embodiment of FIG. 2. However, in this embodiment, the throttle means are configured to slide inside the first tube 10, like a piston. For the purpose of throttling the airflow, the throttling means 30 need not have an extended body as shown. For the purpose of proper guiding though, when moving from the porous material portion 14 to the expose the open portion 15, if included, an extended throttle member 30 is beneficial, as is the support structure 132 after the open portion 15.

Various embodiments have been presented and discussed above. It has also been made clear that features of those embodiments may be combined, where not contradicting. In addition, other embodiment falling within the scope of the appended claims will be conceivable based on the teachings of this disclosure.

The invention claimed is:

1. Supply air device for controlling supply air flow to a building space, comprising:
   a chamber having a supply air inlet and an air outlet;
   a first tube in said chamber, connected at an open first end to the supply air inlet, wherein the first tube has a side wall which is permeable to air; and
   a throttle member slidably connected to the first tube, wherein the throttle member forms a valve mechanism for changing a degree of exposure of the side wall to control air flow through said side wall to the outlet,
   wherein the exposable side wall comprises a layer of porous material through which air is discharged, and a first portion of the side wall adjacent the first end of the tube comprises the layer of porous material, whereas a second portion of the side wall, distal from the first end, is open to provide unrestricted flow upon exposure, and said first tube comprises a metal wire net, rolled up to a cylinder and fitted with said layer of porous material.

2. The supply air device of claim 1, wherein said porous material is a nonwoven fiber felt.

3. The supply air device of claim 1, wherein said porous material comprises polyester fiber.

4. The supply air device of claim 1, wherein said porous material is fabric.

5. The supply air device of claim 1, wherein an initial length portion of the side wall extending from the first end comprises a layer of porous material of a first thickness, and a subsequent length portion of the side wall comprises a layer of porous material of a second thickness which is smaller than the first thickness.

6. The supply air device of claim 5, wherein a double porous material layer is provided at the initial length portion layer, and a single porous material layer is provided at the subsequent length portion.

7. The supply air device of claim 5, wherein the layer of porous material is folded at said initial length portion.

8. The supply air device of claim 1, wherein said throttle member comprises a second tube with an open end, wherein the second tube is configured to slide telescopically about the first tube.

9. The supply air device of claim 8, wherein said second tube has a closed end opposite its open end.

10. The supply air device of claim 1, comprising:
    an actuator configured to move the throttle member along the first tube.

11. The supply air device of claim 1, comprising a suspension mechanism including a guide bar and a support member engaged to the guide bar and axially movable along the guide bar, said suspension mechanism suspending the throttle member or the first tube to the chamber.

12. The supply air device of claim 1, wherein a dust-rejecting protection layer is provided on a surface of an inner face of the layer of porous material.

13. The supply air device of claim 1, wherein a protection layer is provided over both the inner and outer face of the layer of porous material.

14. The supply air device of claim 13, wherein the protection layer is a fiber net.

15. The supply air device of claim 14, wherein the protection layer is folded about an edge of the porous material.

16. The supply air device of claim 14, wherein said fiber net has a mesh size in the range of 0.5-2 mm.

17. Supply air device for controlling supply air flow to a building space, comprising:
    a chamber having a supply air inlet and an air outlet;
    a first tube in said chamber, connected at an open first end to the supply air inlet, wherein the first tube has a side wall which is permeable to air; and a throttle member slidably connected to the first tube, wherein the throttle member forms a valve mechanism for changing a degree of exposure of the side wall to control air flow through said side wall to the outlet, wherein the exposable side wall comprises a layer of porous material through which air is discharged, and a first portion of the side wall adjacent the first end of the tube comprises the layer of porous material, whereas a second portion of the side wall, distal from the first end, is open to provide unrestricted flow upon exposure, said throttle member comprises a second tube with an open end, wherein the second tube is configured to slide telescopically about the first tube, and said second tube has a sound-eliminating sleeve extending axially beyond the open end of the second tube, configured to engage about a rim at the air supply inlet upon closing the valve mechanism.

18. Supply air device for controlling supply air flow to a building space, comprising:

a chamber having a supply air inlet and an air outlet;

a first tube in said chamber, connected at an open first end to the supply air inlet, wherein the first tube has a side wall which is permeable to air; and a throttle member slidably connected to the first tube, wherein the throttle member forms a valve mechanism for changing a degree of exposure of the side wall to control air flow through said side wall to the outlet, wherein the exposable side wall comprises a layer of porous material through which air is discharged, and a first portion of the side wall adjacent the first end of the tube comprises the layer of porous material, whereas a second portion of the side wall, distal from the first end, is open to provide unrestricted flow upon exposure, and a friction-suppressing protection layer is provided on a surface of the layer of porous material, onto which said throttle member is configured to slide.

* * * * *